April 26, 1960     G. J. HOWARD, JR     2,933,892
ANGULAR FREE TURBINE ROTOR DRIVE Filed May 14, 1957     3 Sheets-Sheet 1

INVENTOR
GEORGE J. HOWARD, JR.
BY
AGENT

April 26, 1960 G. J. HOWARD, JR 2,933,892
ANGULAR FREE TURBINE ROTOR DRIVE
Filed May 14, 1957 3 Sheets-Sheet 2

INVENTOR
GEORGE J. HOWARD JR.
BY
AGENT

April 26, 1960

G. J. HOWARD, JR 2,933,892

ANGULAR FREE TURBINE ROTOR DRIVE

Filed May 14, 1957

INVENTOR
GEORGE J. HOWARD JR.
BY
AGENT

United States Patent Office 2,933,892
Patented Apr. 26, 1960

2,933,892

ANGULAR FREE TURBINE ROTOR DRIVE

George J. Howard, Jr., Fairfield, Conn., assignor to United Aircraft Corporation, East Hartford, Conn., a corporation of Delaware Application May 14, 1957, Serial No. 659,093

1 Claim. (Cl. 60—39.16)

This invention relates to a turbine drive for a helicopter rotor in which a free turbine is coupled to a gas generator such as a turbojet engine so that the exhaust of the engine is directed into the free turbine and is a continuation-in-part of United States application Serial No. 598,566 filed July 18, 1956, now abandoned.

An object of this invention is to provide a drive for the rotor blades of a helicopter which will be at an angle to the longitudinal axis of the turbojet engine.

Another object of this invention is to provide a rotor drive which inherently produces a lower r.p.m. eliminating the need for high speed reduction gearing.

A further object of this invention is to reduce in a rotor drive construction high temperature and high speed support bearing problems. The turbine drive disclosed herein eliminates the use of a complicated gearing and clutching arrangement which is now found in numerous other drive systems.

Another object of this invention is to provide a power plant having two turbojet engines mounted in an over-under position in an engine nacelle which are interconnected so as to exhaust into a free turbine unit, said free turbine unit having a drive connection with a rotor.

A further object of this invention is to provide a connection from two or more turbojet engines to a free turbine so that each engine distributes its exhaust to a manifold enclosing a portion of the inlet of said free turbine.

Another object of this invention is to provide a connection from two or more turbojet engines to a free turbine so that each engine distributes its exhaust to a manifold enclosing all of the inlet of said free turbine.

Other objects and advantages will be apparent from the specification and from accompanying figures which illustrate the invention.

Figure 1:
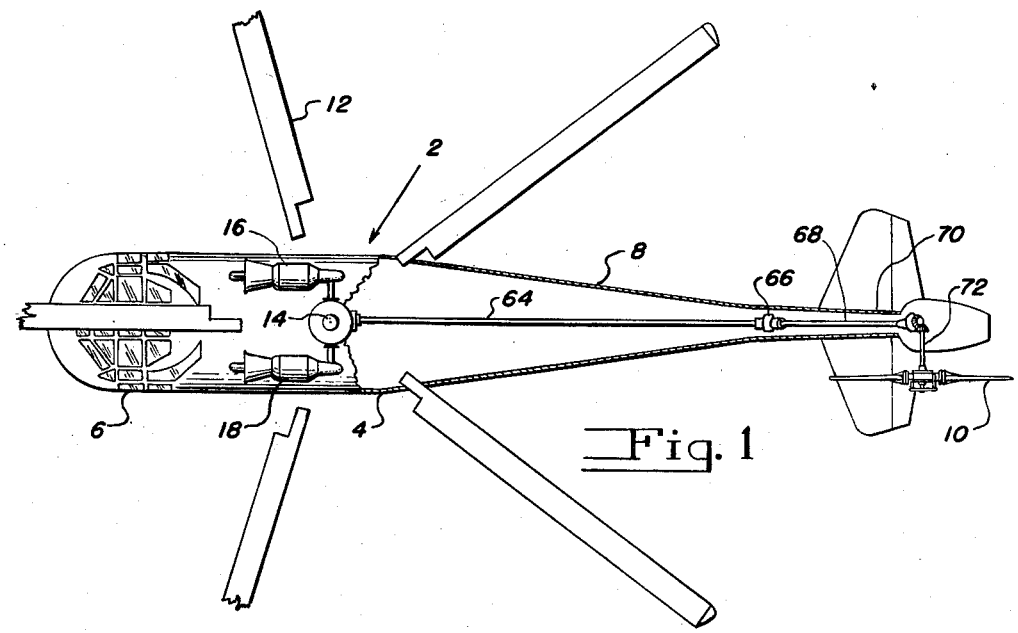
Fig. 1 is a plan view of a helicopter constructed in accordance with subject invention showing a location of the two turbojet engines with the rear portion in section showing the tail rotor drive.

Referring to Fig. 1, the helicopter illustrated comprises a body generally indicated at 2 which includes a center passenger or cargo compartment 4, a pilot compartment 6 and a rearwardly extending tail cone 8 which supports an antitorque tail rotor 10. The rotor blades are indicated at 12 and the mounted for rotation on an upstanding drive shaft 14. The construction of the body, main rotor and tail rotor system can be constructed in a manner similar to that as shown in United States Patent No. 2,755,038 dated July 17, 1956. The pilot compartment accommodates a pilot and the usual instruments for flying a ship.

The ship is supported on the ground by conventional landing gear and the main rotor is shown having five blades which are connected to a rotor head or hub (not shown) which is driven by the drive shaft 14. The usual pilot's controls, collective pitch stick and cycle pitch stick are conventionally connected to the rotary blades through a control linkage and the usual mechanism for controlling the pitch of the blades. Conventional means such as are referred to above are shown in United States Patent No. 2,629,452.

Two turbojet engines 16 and 18 are located one on each side of the aircraft, see Fig. 1, and are mounted by any conventional mounting means. Each turbojet engine is of a conventional and well-known type such as is used to power jet propelled aircraft. The aircraft structure such as customarily used to cover the gear boxes of the conventional helicopters can be extended to cover the engine if desired.

Figure 2:
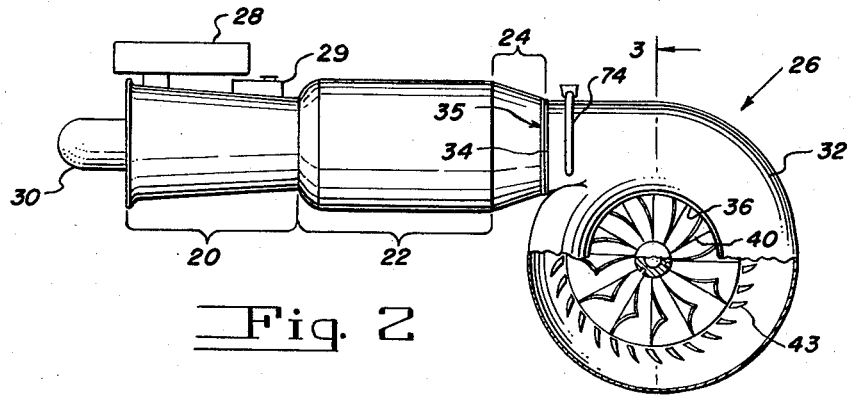
Fig. 2 is a side view of a turbojet engine with a radial inflow type free turbine connected thereto with the lower half of the free turbine being shown in section.

Each turbojet engine has a compressor section 20, burner section 22 and a turbine section 24. In place of the usual tail cone into which the exhaust gases are usually directed, a radial inflow type free turbine 26 is connected to the outlet of the turbine section 24. In the engine shown in Fig. 2, accessories 28 can be mounted above the forward portion of the compressor section and provision can be made to mount the starter and generator in the faired nose section 30 and the oil supply can be carried in tank 39. While these accessories have been shown mounted in this fashion, it is to be understood that any desirable location of the accessories and operating controls can be used.

The radial inflow type free turbine 26 comprises a scroll type exterior housing 32 with an inlet 34 located at the outer radius of the scroll and with an outlet 36 extending outwardly from the side of the free turbine 26. The turbine rotor 38 is located within said scroll having turbine blades 40 extending radially. The scroll 32 receives gases from the turbojet engine at 34 and directs the gases to fixed or adjustable nozzles 43. These nozzles 43 in turn direct the gases upon the faces of the turbine blades 40 to impart a rotary movement to said turbine rotor 38. The gases, after they pass through the radially extending turbine blades 40 to the center of the scroll, are directed out of the scroll through the outlet 36.

A slip joint 35 provided between the turbine section 24 and the inlet 34 to permit axial movement between the turbojet engine and free turbine. Joint 35 also provides for radial movement and rotation at this point. Inlet 34 is coaxially mounted on the outlet of the turbine section 24. This slip joint permits inclination of the power shaft at any angle to the axis of the turbojet.

Rotor 38 is mounted for rotation within said scroll on a shaft 42. The turbine rotor is fixed to the shaft 42 by the use of splines 44 and is axially held in place between shoulder 46 on said shaft and a nut 48 threadably attached to the free end of the shaft 42 extending through the rotor.

Figure 3:
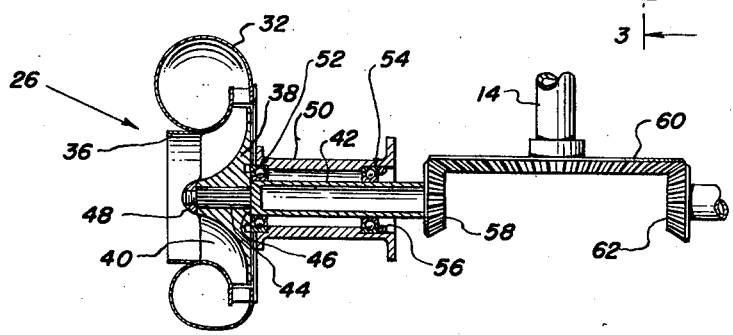
Fig. 3 is a side view of the radial inflow type free turbine taken approximately along the line 3—3 also showing the gearing connection with the rotor turbine shaft.

Shaft 42 is mounted for rotation within a housing 50 which is fixed to said aircraft by the use of ball bearing units 52 and 54 and fixed to the back of said scroll by any means desired such as by bolting or welding. Shaft 42 may extend from the free turbine in a plane normal to the longitudinal axis of the cooperating turbojet engine thus providing a right angle drive. Each of the ball bearing units 52, 54 have their inner bearing rings fixedly attached to the shaft 42 at their inner radii and have their outer bearing rings fixed to said housing 50 at their outer radii. The balls provide the radial and thrust bearing action as in any conventional bearing arrangement. A snap ring 56 is mounted within the housing 50 to maintain the ball bearing unit 54 in place which in turn positions the ball bearing unit 52 and free turbine rotor 38. The free end of the shaft 42 extending away from said scroll has a bevel gear 58 fixedly mounted thereon. Extending from the rotor which carries the rotor blades 12, the drive shaft 14 has a bevel gear 60 mounted on the free end thereof which engages the bevel gear 58 to transmit torque therebetween. While only one scroll and mounting construction is shown in Fig. 3, a similar construction is used to drive the bevel gear 62 on the opposite side of the shaft 14. While as shown herein only two turbines are used to turn the rotor, it is to be understood that any number may be coupled to the rotor drive shaft or that one or more may be uncoupled for flight conditions requiring less than full power. Furthermore, on a single engine helicopter the turbine 26 may be turned to have its axis vertical and thereby drive the rotor directly through a planetary reduction gear.

The turbojet engines 16 and 18 are arranged to rotate the bevel gears 58 and 62 so that they drive the bevel gear 60 in the same direction. This may be done by an idler gear or by directing the gases from the turbojet engine into the free turbines in the proper direction.

From the bevel gear 60 a shaft 64 extends through the fuselage and tail cone to an angle gear box 66 from which a shaft 68 extends through a tail pylon 70 to drive the tail rotor 10 which usually is rotated about a generally horizontal shaft 72. Any conventional tail rotor control may be used. One such tail rotor mounting and pitch control is shown and described in United States Patent No. 2,499,314. Another such control is shown in United States application Serial No. 411,375 filed February 19, 1954, now Patent Number 2,795,284, issued June 11, 1957, to Igor I. Sikorsky for a Tail Rotor Counterweight.

Fuel may be added aft of the turbine section 24 within the scroll 32 through a manifold 74 and ignited therein to permit a higher power to be produced by the free turbine because of the increased turbine inlet temperature. This arrangement may be utilized as emergency boost power on some installations and also could be used continuously allowing a higher horsepower free turbine to be driven by a given turbojet engine.

Figure 4:
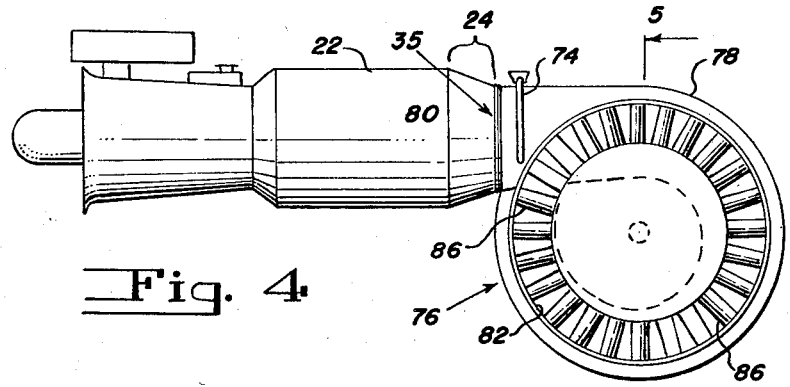
Fig. 4 is a side view showing the rear end of a turbojet engine with an axial flow type free turbine connected thereto.
Figure 5:
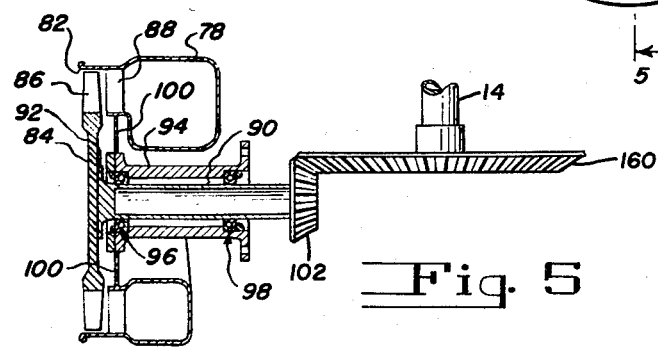
Fig. 5 is a sectional view of the axial flow type free turbine taken along line 5—5 also showing the mounting of the rotor.

While a radial flow type free turbine 26 has been described up to this point, an axial flow type free turbine 76 may also be used such as shown in Figs. 4 and 5.

The axial flow type free turbine 76 comprises a scroll type exterior housing 78 with an inlet 80 located at the outer radius of the scroll and with an outlet 82 extending from the side of the free turbine 76. The turbine rotor 84 is located at the outlet of said scroll having turbine blades 86 extending radially therefrom. The scroll 78 receives gases from the turbojet engine at 80 and directs them to fixed or adjustable nozzles 88. These nozzles 88 in turn direct the gases upon the faces of turbine blades 86 in an axial direction to impart a rotary movement to the rotor 84. The gases after leaving turbine blades 86 pass out through outlet 82. A joint 35, such as described above, is also provided in this installation.

Rotor 84 is mounted for rotation on shaft 90. The turbine rotor is fixed to the shaft 90 by the use of a flange 92 by any desirable means. Shaft 90 is mounted for rotation within a housing 94, which is fixed to said aircraft, by the use of ball bearing units 96 and 98 and fixed to the back of said scroll 78 by a flange 100. These ball bearing units 96 and 98 may be mounted in any desired manner to permit proper rotation. The inner rings are shown fixed in relation to shaft 90 and the outer rings are shown fixed in relation to housing 94. The balls provide the radial and thrust bearing action as in any similar conventional bearing arrangement.

The free end of the shaft 90 extending away from said scroll has a bevel gear 102 fixedly mounted thereon. Bevel gear 102 meshes with bevel gear 160 which in turn is connected to drive shaft 14.

Figure 6:
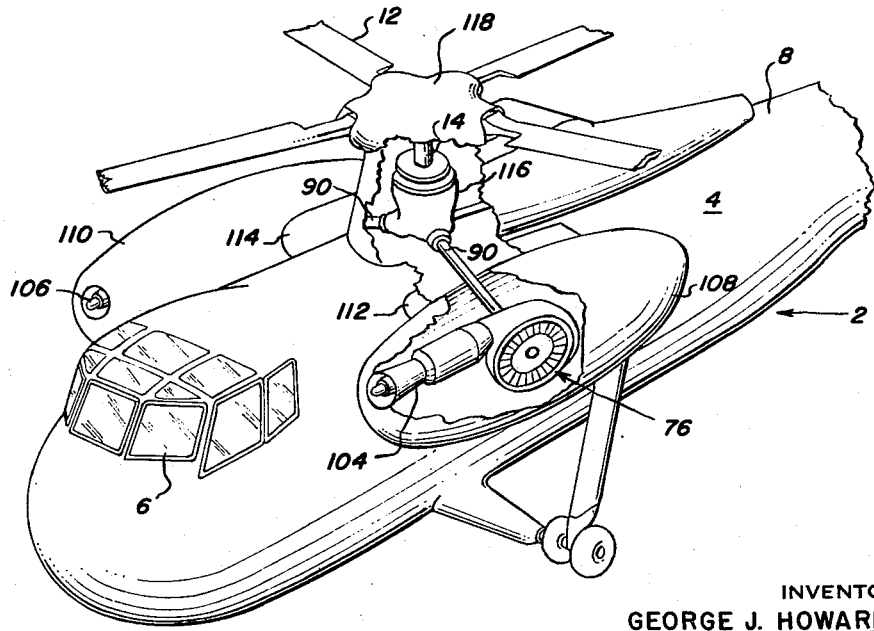
Fig. 6 is a perspective view of a helicopter construction in accordance with subject invention showing a location of one turbojet engine so mounted so as to exhaust into a free turbine unit.

Referring to Fig. 6, a helicopter has been shown similar to that in Fig. 1 except that the turbojet engines 104 and 106 are located in nacelles 108 and 110, respectively, on the side of the craft on wing or support sections 112, 114. Each engine is mounted within its nacelle having its exhaust directed into a free turbine unit which in turn has its shaft 90 connected to a gear box 116 through which shafts 90 drive upstanding drive shaft 14. Shaft 14 is connected to rotor blades 12 by a rotor head 118.

Figure 7:
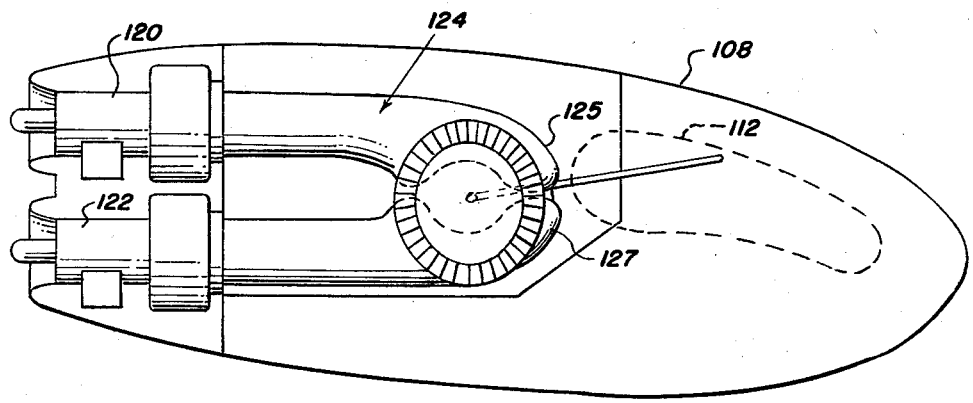
Fig. 7 is a side view of an engine installation in a nacelle in which two turbojet engines in an over-under position have their exhaust ducts connected one each to a manifold enclosing a portion of the inlet to a free turbine unit.

Fig. 7 shows a power unit mounted in a nacelle consisting of two turbojet units 120 and 122 which are arranged in an over-under position with their exhausts directed into a manifold 124 which is formed of two sections 125 and 127. The exhaust from engine 120 is directed into manifold section 125 and the exhaust from engine 122 is directed into manifold section 127. Each manifold section 125, 127 directs its exhaust upon one-half of the turbine blades of the rotor 84 by the use of properly positioned nozzles or turning vanes.

Figure 8:
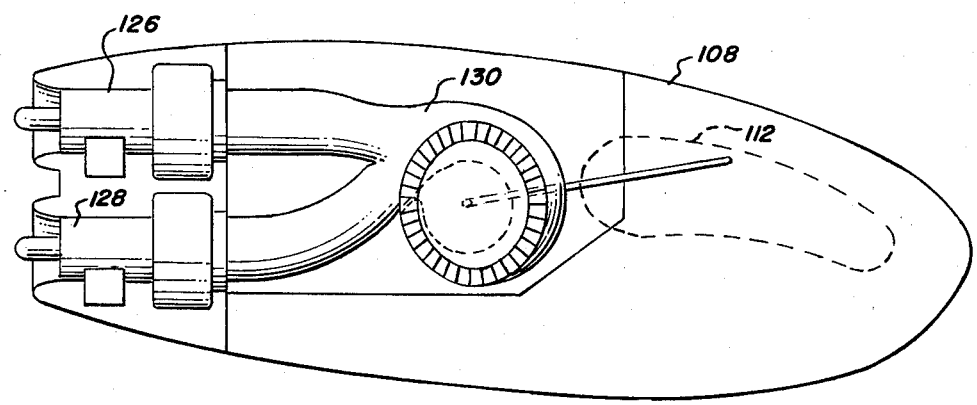
Fig. 8 is a side view of an engine installation in a nacelle in which two turbojet engines in an over-under position have their exhaust ducts connected into a single manifold.

Fig. 8 shows a power unit mounted in a nacelle consisting of two turbojet units 126 and 128 which are arranged in an over-under position with their exhausts directed into a manifold 130 so that the exhaust from both engines is available to the whole inlet of the free turbine unit. Manifold 130 encloses the entire inlet of the free turbine unit. Here if one turbojet unit ceases to function, the remaining engine will supply its exhaust to the entire inlet of the free turbine unit.

It is to be understood that the invention is not limited to the specific embodiment herein illustrated and described, but may be used in other ways without departure from the spirit of the invention as defined by the following claim.

I claim:

A power plant having in combination, a single output shaft, a housing, said housing comprising two parts, a first part forming a turbojet engine housing, a second part forming a free turbine housing, the first part of the housing having an inlet and outlet located along a longitudinal axis, the second part of the housing being a scroll type housing having an inlet at its outer radius and an outlet at its side, means connecting the inlet of said second part to the outlet of said first part so that all of the exhaust gases from said outlet of the first part are directed into the inlet of the second part, said connecting means providing relative axial and rotational movement between the outlet of the first part and inlet of the second part, and a free turbine rotor, said free turbine rotor being mounted on said single output shaft, said free turbine rotor and single output shaft being positioned in said scroll type housing for rotation, said scroll type housing having an axis of rotation for said free turbine rotor and shaft located at an angle to the longitudinal axis of said first part, said turbine rotor having blades positioned therearound, said scroll type housing having a plurality of nozzles located between its inlet and said blades so that the gases from said turbojet engine are directed against them in a manner to rotate said rotor.

References Cited in the file of this patent

UNITED STATES PATENTS

| | | |
|---|---|---|
| 2,663,141 | Hage | Dec. 22, 1953 |
| 2,654,993 | Owner | Oct. 13, 1953 |
| 2,755,038 | Gluhareff | July 17, 1956 |

FOREIGN PATENTS

| | | |
|---|---|---|
| 625,802 | Great Britain | July 4, 1949 |
| 1,029,081 | France | Mar. 4, 1953 |